(12) United States Patent
Chang et al.

(10) Patent No.: US 8,437,077 B2
(45) Date of Patent: May 7, 2013

(54) MEASUREMENT APPARATUS

(75) Inventors: Chih-Kuang Chang, Taipei Hsien (TW); Dong-Hai Li, Shenzhen (CN); Li Jiang, Shenzhen (CN); Yong-Hong Ding, Shenzhen (CN); Xiao-Guang Xue, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 379 days.

(21) Appl. No.: 12/848,237

(22) Filed: Aug. 2, 2010

(65) Prior Publication Data

US 2011/0069383 A1     Mar. 24, 2011

(30) Foreign Application Priority Data

Sep. 24, 2009    (CN) .......................... 2009 1 0307670

(51) Int. Cl.
     *G02B 21/06*      (2006.01)
     *F21V 33/00*      (2006.01)

(52) U.S. Cl.
     USPC ........... 359/385; 359/386; 359/387; 359/388; 359/389; 359/390; 362/249.11; 362/296.05; 362/311.02

(58) Field of Classification Search .......... 359/385–390, 359/371; 362/249.11, 296.05, 311.02
See application file for complete search history.

(56) References Cited

U.S. PATENT DOCUMENTS

| | | | | |
|---|---|---|---|---|
| 5,369,492 A | * | 11/1994 | Sugawara | ...................... 356/394 |
| 5,690,417 A | * | 11/1997 | Polidor et al. | ................. 362/244 |
| 2010/0165086 A1 | * | 7/2010 | Chang et al. | .................... 348/61 |

OTHER PUBLICATIONS

Dierk Raabe, Michael Sachtleber; Measurement of Plastic Strains by 3D Image Correlation Photogrammetry at the Grain Scale; Feb. 7, 2008; pp. 1-10.*

* cited by examiner

*Primary Examiner* — Scott J Sugarman
*Assistant Examiner* — Robert E Tallman
(74) *Attorney, Agent, or Firm* — Altis Law Group, Inc.

(57) ABSTRACT

A measurement apparatus includes a lamp mount including a first mount and a second mount. The first mount has a first cavity to mount an observation module. The second mount has a second cavity to mount an image capture module. The measurement apparatus further includes a plurality of light modules mounted on an undersurface of the lamp mount. The second mount is disposed with an included angle relative to a first axis of the first cavity so that a second axis of the second cavity and the first axis converge on a point. The undersurface of the lamp mount is concave so that light from the light modules tilts toward the first axis, and the light and the first axis also converge on the point.

6 Claims, 3 Drawing Sheets

MEASUREMENT APPARATUS

BACKGROUND

1. Technical Field

The present disclosure relates to a measurement apparatus for measuring an object.

2. Description of Related Art

An image measurement apparatus is often applied to measuring workpieces through a microscope disposed on the image measurement apparatus. The image measurement further includes a lighting module to light the workpieces. However, the illumination of the light module for the workpieces is not bright and broad enough.

DETAILED DESCRIPTION

Figure 1:
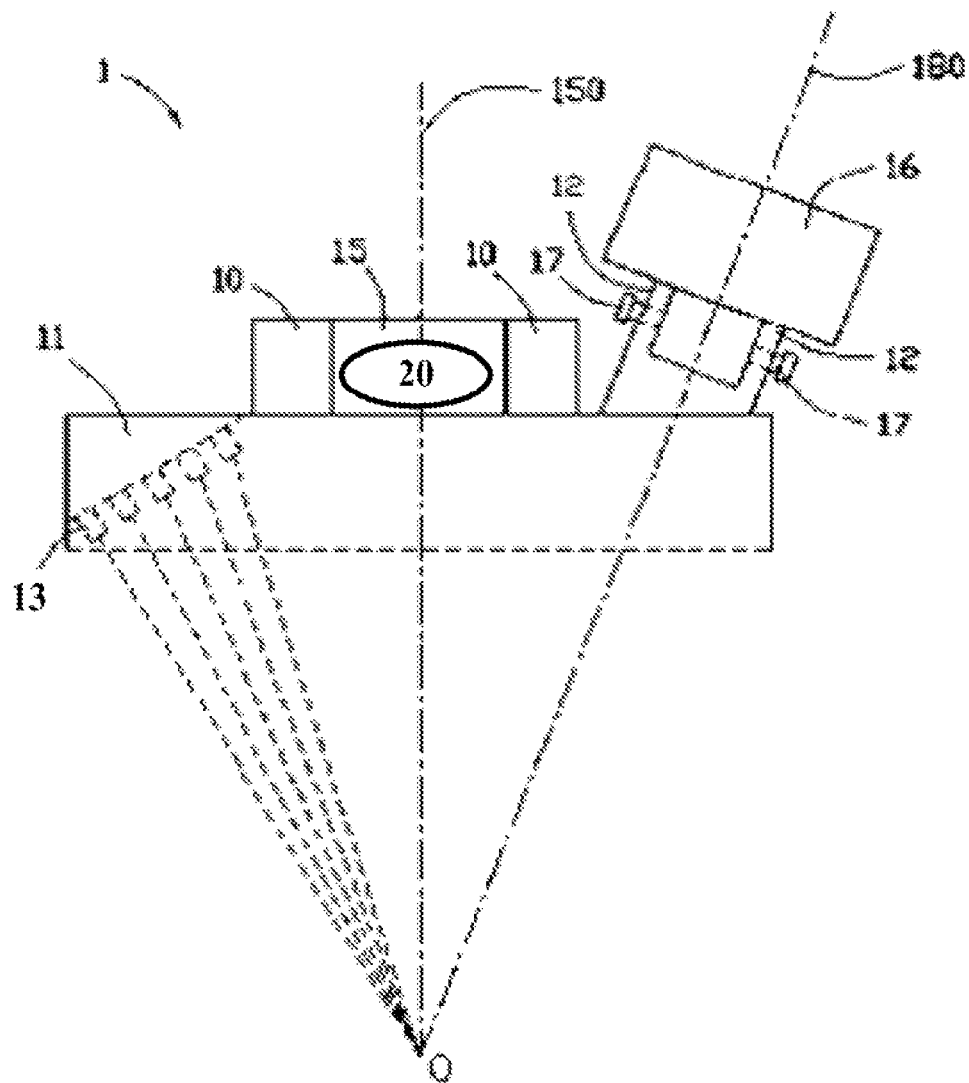
FIG. 1 is a lateral view of one embodiment of a measurement apparatus.

FIG. 1 is a lateral view of one embodiment of a measurement apparatus 1 of the present disclosure. The measurement apparatus 1 can be used to measure dimensions of an object. The object may be a workpiece, an electronic component, or a mechanical component, for example. The measurement apparatus 1 includes a first mount 10, a lamp mount 11, and a second mount 12. The first mount 10 has a first cavity 15 to mount an observation module 20, as shown in FIG. 1. The second mount 12 has a second cavity 18 to mount an image capture module 16. The second mount 12 further includes at least two threaded holes (not shown) for inserting at least two screws 17 to fasten the image capture module 16. In the embodiment, the observation module 20 may be a microscope and the image capture module 16 may be a digital camera.

The measurement apparatus 1 further includes a plurality of light modules 13 mounted on the lamp mount 11. The lamp mount 11 is concave-shaped, and partially showed in FIG. 1. The second mount 12 is disposed with an included angle relative to a first axis 150 of the first cavity 15 so that a second axis 180 of the second cavity 18 and the first axis 150 may converge on a point O. Because the lamp mount 11 is concave, light from the light modules 13 tilts toward the first axis 150. As a result, the light and the first axis 150 also converge on the point O. In other words, the light from the light modules 13, the first axis 150, and the second axis 180 converge on the point O. The point O may be any point on the object. The shadow of the object may be avoided when observing the object due to the light from the light modules 13 tilts toward the first axis.

Figure 2:
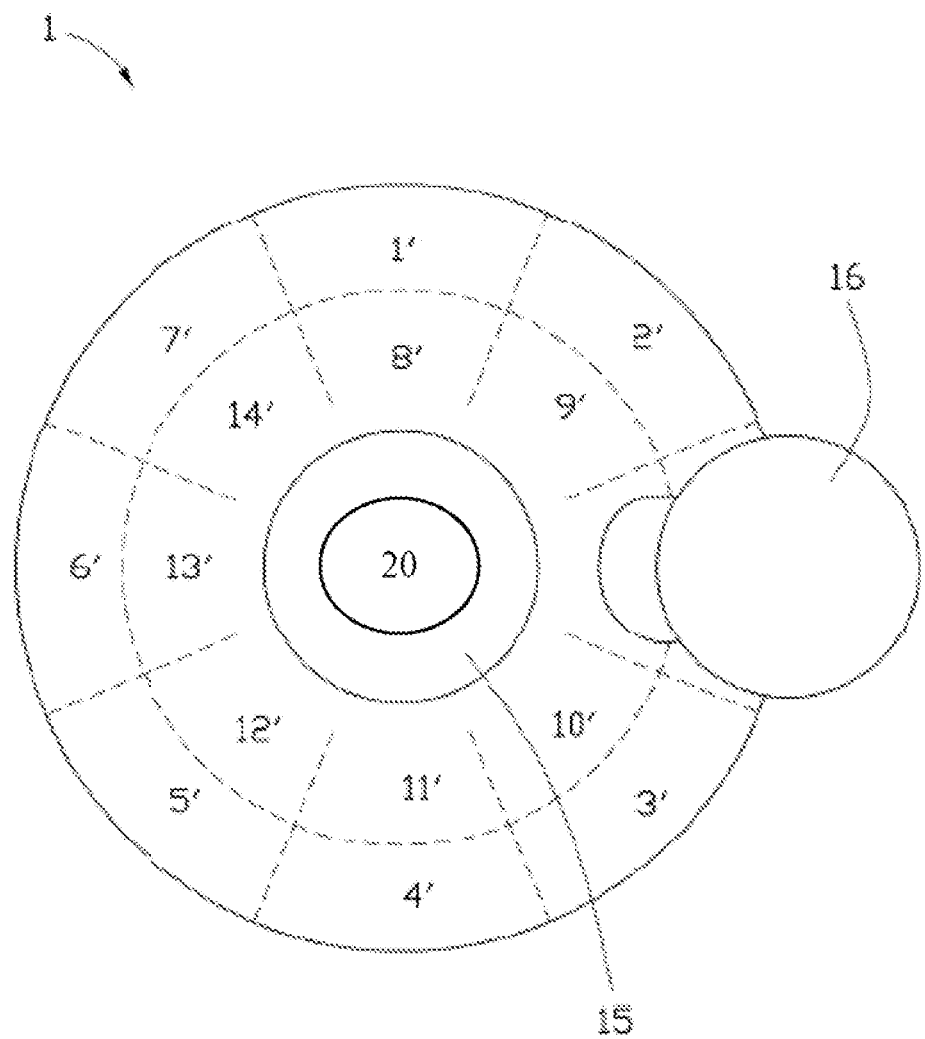
FIG. 2 is a vertical view of the measurement apparatus of FIG. 1.

FIG. 2 is a vertical view of the measurement apparatus 1 of FIG. 1. In the exemplary embodiment, the undersurface of the lamp mount 11 may be divided into fourteen lighting areas 1'-14' (shown as dotted line sections). The light modules 13 may be uniformly mounted on the fourteen lighting areas 1'-14' of the undersurface of the lamp mount 11.

Figure 3:
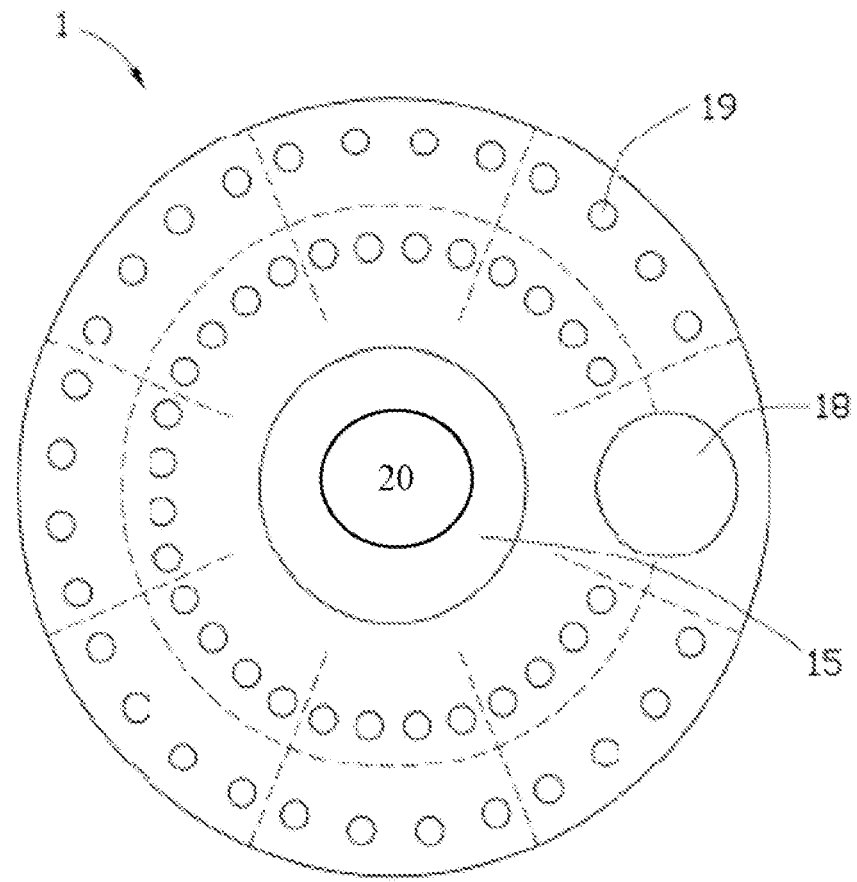
FIG. 3 is an upward view of the measurement apparatus of FIG. 1.

FIG. 3 is an upward view of the measurement apparatus of FIG. 1. In the exemplary embodiment, the lighting areas 1'-14' individually includes four mount holes to mount four light modules 13. As a result, the measurement apparatus 1 may individually control light modules 13 of the lighting areas 1'-14', and provide bright and broad light for the object when observing.

Because the first axis and the second axis converge on a point, a first optical axis of the microscope mounted in the first mount and a second optical axis of the digital camera mounted in the second mount converge on the point. As a result, focus of visual observation through the microscope and focus of the digital camera may be the same point on the object. The measurement apparatus furthermore provide bright and broad light for the object when observing.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A measurement apparatus, comprising:
    a lamp mount comprising a first mount and a second mount, wherein the first mount is operable to mount an observation module and the second mount is operable to mount an image capture module, wherein the second mount is disposed with an included angle relative to a first axis of the first cavity so that a second axis of the second cavity and the first axis converge on a point;
    a plurality of light modules mounted on an undersurface of the lamp mount;
    wherein the first mount includes a first cavity to mount the observation module and the second mount includes a second cavity to mount the image capture module.

2. The measurement apparatus of claim 1, wherein the undersurface of the lamp mount is concave so that light from the light modules tilts toward the first axis, and the light and the first axis converge on the point.

3. The measurement apparatus of claim 2, wherein the image capture module is a camera.

4. The measurement apparatus of claim 2, wherein the observation module is a microscope.

5. The measurement apparatus of claim 2, wherein the plurality of light modules are uniformly mounted on of a plurality of lighting areas of the undersurface of the lamp mount.

6. The measurement apparatus of claim 2, wherein the plurality of light modules are a plurality of LEDs.

* * * * *